United States Patent [19]
Wingert

[11] Patent Number: 5,954,524
[45] Date of Patent: Sep. 21, 1999

[54] GROUNDING ARRANGEMENT, ESPECIALLY FOR CLEAN ROOMS

[75] Inventor: Erhard Wingert, Stuttgart, Germany

[73] Assignee: Meissner & Wurst GmbH & Co., Stuttgart, Germany

[21] Appl. No.: 08/970,929

[22] Filed: Nov. 14, 1997

[30] Foreign Application Priority Data

Nov. 14, 1996 [DE] Germany .................. 296 19 800 U

[51] Int. Cl.[6] ...................................................... H01R 4/66
[52] U.S. Cl. .................... 439/92; 174/35 MS; 174/35 R; 174/51
[58] Field of Search ................ 175/51; 439/92, 439/801, 782, 781; 174/51

[56] References Cited

U.S. PATENT DOCUMENTS

| 3,638,404 | 2/1972 | Moll et al. ......................... 55/473 |
| 3,720,903 | 3/1973 | Schor ................................. 439/608 |
| 3,848,956 | 11/1974 | Kraft ................................. 439/411 |
| 4,140,961 | 2/1979 | Akamatsu ........................ 323/358 |
| 4,707,914 | 11/1987 | Schauer ............................... 29/872 |
| 4,928,210 | 5/1990 | Hayakawa et al. ............. 362/217 |
| 5,108,296 | 4/1992 | Takano et al. ..................... 439/92 |
| 5,231,357 | 7/1993 | Moody et al. .................... 324/539 |
| 5,346,403 | 9/1994 | Hyzin ................................. 439/95 |
| 5,433,630 | 7/1995 | Inaba et al. ..................... 439/843 |
| 5,673,522 | 10/1997 | Schilham ........................... 52/263 |

*Primary Examiner*—Paula Bradley
*Assistant Examiner*—Cecelia Wright Brown
*Attorney, Agent, or Firm*—Robert W. Becker & Associates

[57] ABSTRACT

A grounding arrangement, especially for clean rooms, is provided. The arrangement includes grounding conductors to which electrically conductive components, such as metallic housings of machines, are connected by connecting lines. The conductors are flexible leads that are conductively interconnected by connecting terminals. The conductors are connected to a foundation by at least one shunt line.

12 Claims, 2 Drawing Sheets

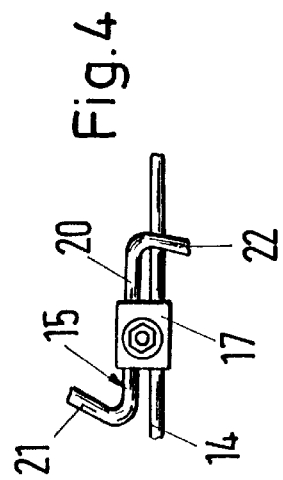
Fig. 3
Fig. 4
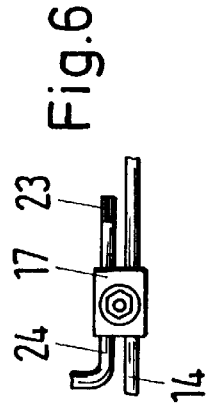
Fig. 5
Fig. 6
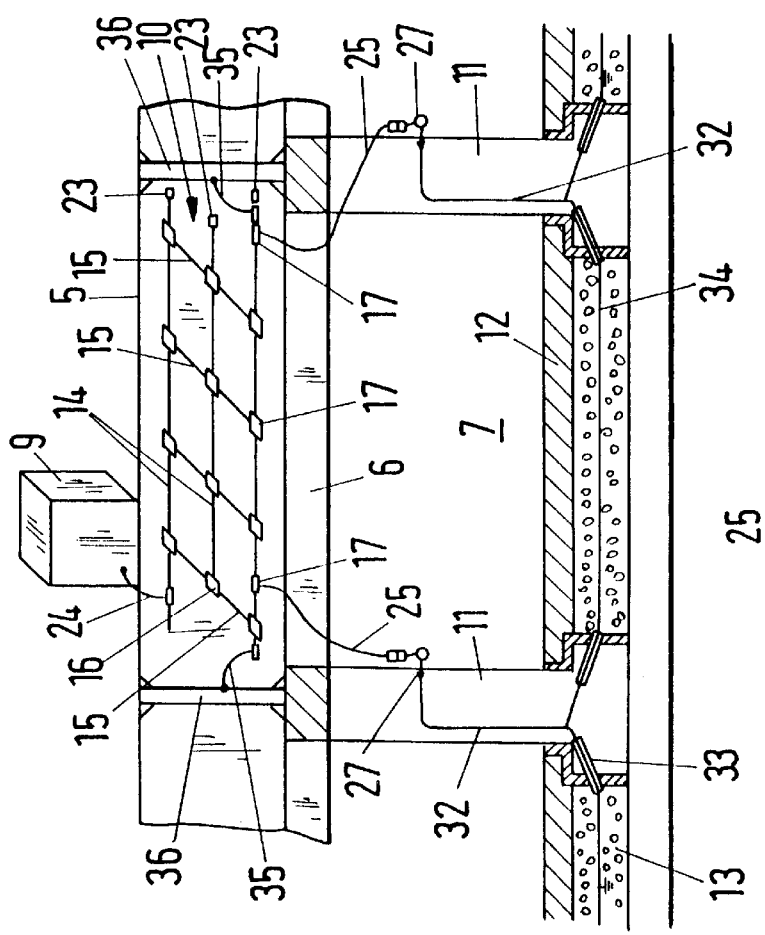
Fig. 2
Fig. 7

005,954,524

GROUNDING ARRANGEMENT, ESPECIALLY FOR CLEAN ROOMS

BACKGROUND OF THE INVENTION

The present invention relates to a grounding arrangement, especially for clean rooms, and includes grounding conductors to which electrically conductive components, such as metallic housings of machines, are connected via a connecting lines. The conductors are connected to a foundation or the subsurface ground via at least one shunt line.

The purpose of such grounding arrangements is to ground electrically conductive components, such as metallic housings of machines. For this purpose, it is known to use copper rails or bars in the clean room, which are disposed and secured in a double floor of the clean room. The copper rails are provided with mounting holes to which can be connected equipment as well as metallic components that are part of the clean room. The copper rails must be put in place together with the double floor. Since different technicians are required for the placement of the double floor and for the placement of the copper rails, scheduling becomes a considerable problem during the construction of a clean room. Since the copper rails are not mass produced parts there are frequently delivery problems. Furthermore, since the copper rails are rigid, there is only little clearance during placement and during assembly of the copper rails. Additional holes must also frequently be located on the copper rails since when the equipment is set up in the clean room, the normally provided holes in the copper rails may not be sufficient. Providing additional holes leads to metal shavings as well as to contamination of the clean room. In addition, since wet work is also done in the clean room, the discharge of liquid results in the problem of contact corrosion on the copper rails, which has an adverse effect upon the ability of the grounding arrangement to work. Finally, manufacture and also the assembly of copper rails is expensive.

It is therefore an object of the present invention to provide a grounding arrangement of the aforementioned general type that is more economical to manufacture and install, and that can be easily adapted to very different installation conditions.

BRIEF DESCRIPTION OF THE DRAWINGS

This object, and other objects and advantages of the present invention, will appear more clearly from the following specification in conjunction with the accompanying schematic drawings, in which:

FIG. 2 shows the inventive grounding arrangement provided in a double floor and a technical floor of the clean room of FIG. 1;

FIGS. 3 to 7 show various connections of the inventive grounding arrangement.

SUMMARY OF THE INVENTION

Figure 1:
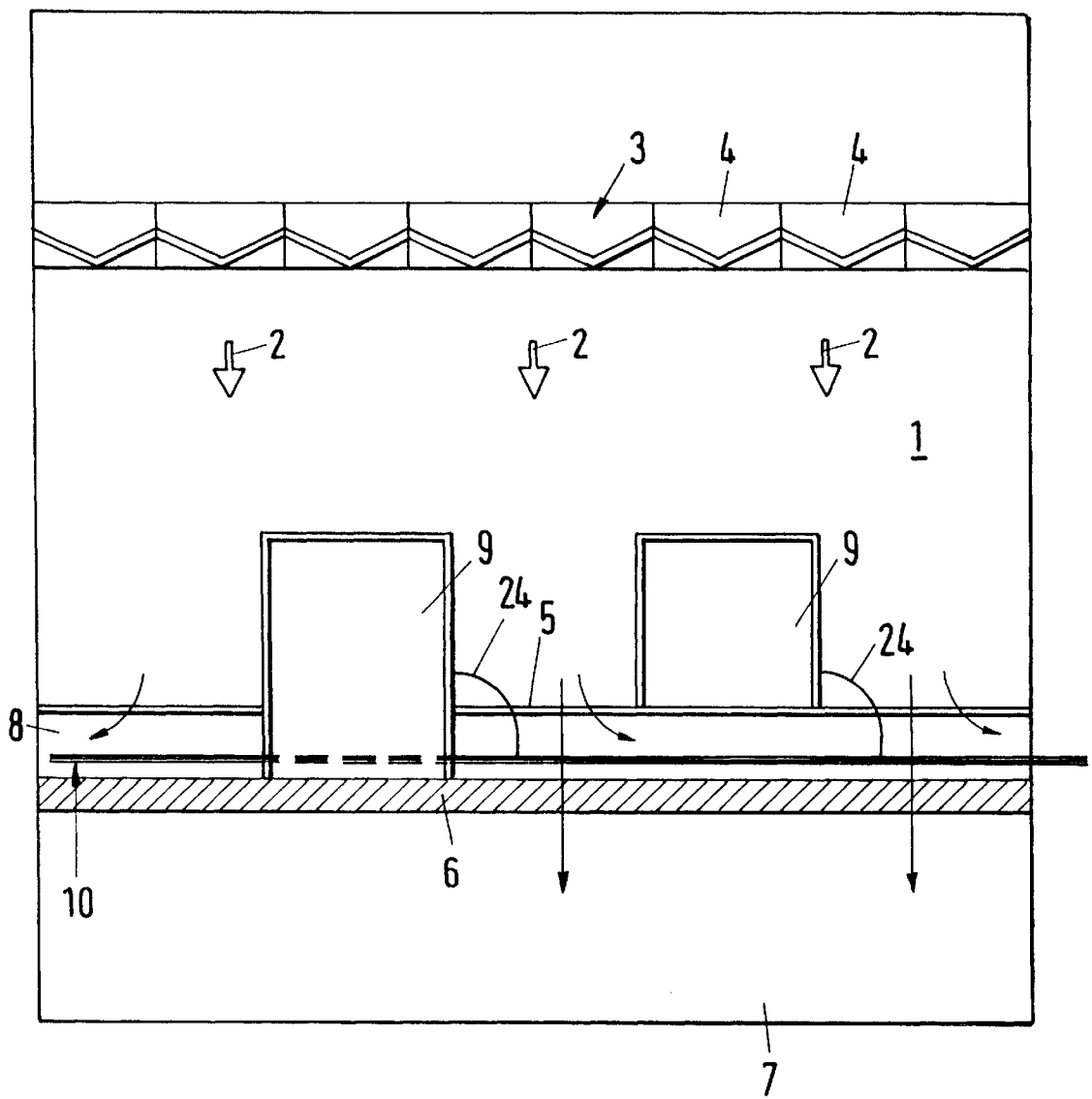
FIG. 1 illustrates a clean room that is provided with one exemplary embodiment of the inventive grounding arrangements.

The grounding arrangement of the present invention is characterized primarily in that the grounding conductors are flexible leads that are conductively interconnected by connecting terminals.

With the inventive grounding arrangement, the grounding conductors are formed by flexible leads. Due to their flexibility, these conductors can be placed in any desired manner in the space that is provided for installation. In particular, it is easy to bypass obstacles. The flexible leads are economical, and represent mass produced goods, so that no problems with delivery are encountered. By means of the connecting terminals, the flexible leads are conductively connected at those locations where it is necessary to do so. The connecting terminals can also be conventional components that are economically available at all times. The flexible leads can be placed on site without first needing an expensive plan or design. The flexible leads can be withdrawn from a drum. It is merely necessary to cut the leads to the required length and to insulate the ends. Thus, the inventive grounding arrangement ensures a trouble-free and easy assembly that above all else is extremely economical.

Further specific features of the present invention will be described in detail subsequently.

DESCRIPTION OF PREFERRED EMBODIMENTS

Referring now to the drawings in detail, the grounding arrangement of the present invention is advantageously used in a clean room, but can also be used for other systems where grounding is intended or is even prescribed. The following description of the inventive grounding arrangement will be made in conjunction with a clean room.

FIG. 1 schematically illustrates a clean room 1 through which clean air flows vertically in the direction of the arrows 2. The clean room 1 is delimited at the top by a grate or screen ceiling 3 that in a known manner has a non-illustrated frame construction that holds filter/blower units 4. The base 5 of the clean room 1 is embodied as a double floor. Disposed below the double floor 5 is the ceiling 6 of a technical floor 7, for example a floor or room for engineering or technical equipment, with the floor 7 being disposed in the region below the clean room 1. The double floor 5 is provided in a known manner with apertures for the clean air 2, which thus flows through the double floor 5 into a space 8. In this space 8, the clean air 2 is deflected and is drawn upwardly in a known manner by non-illustrated blowers of the filter/blower units 4. The clean air then flows through the suspended screen ceiling 3 from above back downwardly into the clean room 1. A portion of the clean air that passes through the double floor 5 can flow via non-illustrated openings in the ceiling 6 into the technical floor 7.

Placed up on the double floor 5 are machines 9, so-called equipment. In FIG. 1, only one such equipment is illustrated. The equipment 9 can also extend through openings in the double floor 5 and rest upon the ceiling 6, as illustrated in FIG. 1 for example for the equipment 9 on the left.

The machines 9 are connected to a grounding arrangement 10 that is disposed in the double floor 5.

As shown in FIG. 2, the ceiling 6 is supported by pillars 11 on a base 12. This base 12 is disposed on a foundation 13.

The grounding arrangement 10 has a grate-like configuration and is provided with intersecting conductors 14, 15 that preferably intersect at right angles to one another and that are conductively interconnected at the points of intersection 16 in a manner to be described subsequently. The conductors 14, 15 are advantageously embodied as ground conductors and have an insulating cover, which is preferably made of polyvinylchloride but can also be made of any other insulating polymeric material. The insulating cover surrounds a plurality of individual leads. The conductors 14, 15 are therefore advantageously multi-conductors. The insulating cover ensures that no moisture can reach the leads within the conductors 14, 15. Mounted at the points of intersection 16 are connecting terminals 17, which are known per se and will therefore not be described in detail. The terminals 17 comprise two parts that can be clamped together and are provided with metallic teeth on those sides that face one another. When the terminal parts are clamped together, the teeth penetrate the insulating cover of the those regions of the conductors 14, 15 that are disposed between the teeth. In this way, the connecting terminals 17 establish an electrical connection between the intersecting conductors 14, 15.

FIG. 3 shows the connecting terminal 17 that connects a conductor 14 that is disposed along the edge with a conductor 15 that extends perpendicular thereto. The conductor 14 that extends along the edge extends linearly, whereas that conductor 15 that is disposed perpendicular thereto is held in the connecting terminal 17 by means of an angled-off end 18. In the illustration of FIG. 3, the two parts of the connecting terminal 17 are, in the plane of the drawing, placed from above and below against the conductor 14 and against the angled-off end 18 of the conductor 15. Subsequently, the two parts of the connecting terminal 17 are drawn against one another by means of a setscrew 19, in connection with which the non-illustrated metallic teeth of these terminal parts penetrate the insulation of the conductors 14, 15 and come into contact with the leads that are surrounded by the insulating cover. The angled-off end 18 of the conductor 15 is spaced from and extends parallel to the conductor 14 that is disposed along the edge. In the manner described, the respective angled-off ends 18 of the conductors 15 are connected with the two conductors 14 that are disposed along the edges (FIG. 2).

In the same manner, the conductor 15 that in FIG. 2 extends along the left edge is also connected with an end of the central conductor 14 by means of the connecting terminal 17.

FIG. 4 shows the conditions at the points of intersection 16. In order to be able to connect the two conductors 14, 15 by means of the connecting terminal 17, the one conductor 15 is bent in the region of the intersection to have an approximately Z shape. As a result, a central portion 20 of this conductor 15, which is engaged by the connecting terminal 17, is spaced from and extends parallel to the conductor 14. The central portion 20 as well as the conductor 14 that extends parallel thereto are conductively interconnected by the connecting terminal 17 in the manner previously described. The parts 21 and 22 of the conductor 15 that adjoin the central portion 20 thereof extend to the conductors 14 that are disposed along the edge (FIG. 2), to the extent that the grounding arrangement 10 has merely three conductors 14 that extend parallel to one another.

As shown in FIG. 2, the right-hand ends of the conductors 14 extend beyond the corresponding conductor 15 that is disposed along the edge. In this case, there is placed upon the ends of these conductors 14 an end cap 23 (FIG. 5), so that the exposed ends of the leads within the respective conductor 14 are covered. In the same way, an appropriate end cap 23 is placed upon the end of the angled-off part 18 of the conductor 15 (FIG. 3).

FIG. 6 shows the connection between a conductor 14 that is disposed along the edge and a connecting line 24, by means of which the respective machine 9 is connected to the grounding arrangement 10 (FIG. 2). The connecting line 24 advantageously has the same configuration as do the conductors 14, 15. The connection between the two conductors 14, 24 is also effected by means of the connecting terminal 17. Placed upon the free end of the connecting line 24 is the end cap 23.

All of the machines 9 are connected via a respective connecting line 24 to the grounding arrangement 10 in the manner described (FIG. 1). The connecting line 24 can be connected to one of the conductors 14, 15 of the grounding arrangement 10 via the connecting terminal 17. The connecting locations can be effected within the grounding arrangement 10 at any suitable location.

As shown in FIG. 2, shunt lines 25 are connected to the grounding arrangement 10. These shunt lines are formed by conductors that are advantageously embodied in the same way as are the conductors 14, 15. In the illustrated embodiment, the shunt lines 25 are each connected by a respective connecting terminal 17 to a conductor 14 that is disposed along the edge. The two shunt lines 25 are respectively guided to a pillar 11. As shown in FIG. 7, fastened on the free end of the shunt line 25 is a terminal 26 by means of which the shunt line 25 is connected to a grounding connection 27. Accompanied by the interposition of a tightening member or washer 28, the terminal 26 is secured in a known manner to the grounding connection 27 via a screw 29. Provided between the grounding connection 27 and the terminal 26 is a contact disk or member 30 that is provided on both sides with teeth and through which extends the screw 29. In order to ensure a good contact between the terminal 26 and the grounding connection 27, a contact protecting paste 31 is applied to both sides of the contact member 30.

A further shunt line 32 (FIG. 2) leads from the grounding connection 27, through a duct or other passage 33, into the foundation or subsurface ground 13.

The shunt line 32 is connected with the shunt line 32 of the neighboring grounding connection 27 by means of a connecting line 34, which is guided through the foundation 13.

As a further grounding measure, the grounding arrangement 10 is connected via connecting lines 35 with support members 36 that extend between the floor covering or ceiling 6 and the floor 5 (FIG. 2). The connecting lines 35 are also connected via the connecting terminals 17 to the corresponding conductors 14, 15 of the grounding arrangement 10.

The connecting lines 34 and 35 are preferably embodied in the same manner as are the conductors 14, 15 of the grounding arrangement 10.

In the manner described, the conductors 14, 15 are provided in the grate-like configuration in the double floor 5, in other words, are disposed in the double floor. Since the individual conductors 14, 15 are covered with insulating material they are excellently protected against moisture. By mean of the connecting terminals 17, the required electrical connection between the conductors 14, 15 is achieved in a straightforward manner. The teeth of the connecting terminals 17 penetrate the insulating cover of the conductors 14,15. Since the same connecting terminals 17 clamps or terminals can be used. Also the connecting lines 24, 25, 35 are connected to the grounding arrangement 10 with the connecting terminals 17. The conductors 14, 15 are very flexible, so that placement thereof presents no problems. Depending upon the installation space that is present, the conductors 14, 15 can be disposed in any desirable manner, for example also being placed so as to go around obstacles. The grounding arrangement 100 can be introduced after assembly of the double floor 5, so that for example difficulties in coordinating schedules between the assemblers of the double floor and of the grounding arrangement are minimized. Since standard parts are used for the grounding arrangements, they can be obtained without difficulty and in particular without delivery problems. The flexible conductors 14, 15 can be withdrawn from a drum and disposed in the double floor 5. The machines 9 can be connected at any desired location and as often as desired. Variations in dimension and assembly tolerances need not be paid attention to since the flexible conductors 14, 15 can be brought to the desired location without difficulty. The conductors 14,15 are merely cut to the desired length. The connecting terminals 17 are clamped to the conductors 14, 15 in the manner described, for which purpose it is merely necessary to undertake a simple screwing procedure. The conductors 14, 15 can be cut on site, so that installation conditions can easily be taken into account. It is possible at any time to alter the grounding arrangement 10 without difficulty. Since the conductors 14, 15 are covered with polymeric material, no copper abrasion occurs that could contaminate the clean room 1 or the clean air.

In the illustrated embodiment the grounding arrangement 10 is disposed in the double floor 5 of the clean room 1. However, the grounding arrangement 10 can also be disposed in the same manner, for example, in the ceiling, for example for clean rooms in the pharmaceutical industry.

The present invention is, of course, in no way restricted to the specific disclosure of the specification and drawings, but also encompasses any modifications within the scope of the appended claims.

What I claim is:

1. A grounding arrangement comprising:

grounding conductors to which electrically conductive components are adapted to be connected via connecting lines, wherein said grounding conductors are flexible leads;

connecting terminals for conductively interconnecting said leads of said grounding conductors;

at least one shunt line connecting said grounding conductors to a foundation.

2. A grounding arrangement according to claim 1, wherein said grounding conductors are disposed in a grate-like configuration.

3. A grounding arrangement according to claim 1, wherein said grounding conductors intersect one another, and wherein said connecting terminals conductively interconnect said grounding conductors at points of intersection.

4. A grounding arrangement according to claim 1, wherein said connecting lines are flexible.

5. A grounding arrangement according to claim 1, wherein said grounding arrangement is accommodated in a floor of a clean room.

6. A grounding arrangement according to claim 1, wherein said grounding arrangement is disposed in a ceiling region of a clean room.

7. A grounding arrangement according to claim 1, wherein said grounding conductors are provided with an insulating cover that surrounds individual leads.

8. A grounding arrangement according to claim 7, wherein said connecting terminals penetrate said insulating cover of said grounding conductors.

9. A grounding arrangement according to claim 1, wherein said connecting terminals comprise two parts that can be secured together.

10. A grounding arrangement according to claim 9, wherein at least one and preferably both of said connecting terminal parts are provided with metallic teeth.

11. A grounding arrangement according to claim 1, wherein said grounding arrangement is connected with said at least one shunt line via at least one flexible line.

12. A grounding arrangement according to claim 9, wherein said at least one flexible line is connected to said grounding arrangement and to said to at least one shunt line via further ones of said connecting terminals.

\* \* \* \* \*